United States Patent [19]

Vanzo et al.

[11] 4,071,670

[45] Jan. 31, 1978

[54] METHOD OF SIZING MONOMER DROPLETS FOR SUSPENSION POLYMERIZATION TO FORM SMALL PARTICLES

[75] Inventors: Edward Vanzo, Webster; Lewis S. Smith, Penfield, both of N.Y.

[73] Assignee: Xerox Corporation, Stamford, Conn.

[21] Appl. No.: 710,495

[22] Filed: Aug. 2, 1976

[51] Int. Cl.[2] .......................... C08F 2/20; C08F 12/08; C08F 20/18

[52] U.S. Cl. .................................... 526/88; 260/42.53; 526/202; 526/329; 526/346

[58] Field of Search ................ 526/88, 202; 260/42.53

[56] References Cited

U.S. PATENT DOCUMENTS

| | | | |
|---|---|---|---|
| 2,674,593 | 4/1954 | Condo et al. | 526/88 |
| 2,701,245 | 2/1955 | Lynn | 526/88 |
| 2,981,722 | 4/1961 | Enk et al. | 526/88 |
| 3,544,500 | 12/1970 | Osmond et al. | 260/42.53 |
| 3,620,988 | 11/1971 | Cohen | 526/202 |
| 3,682,877 | 8/1972 | Czekay et al. | 526/88 |
| 3,810,958 | 5/1974 | Takahashi et al. | 526/88 |
| 3,833,541 | 9/1974 | Shen | 260/42.53 |
| 3,933,771 | 1/1976 | Eastman et al. | 526/88 |

*Primary Examiner*—Alan Holler

*Attorney, Agent, or Firm*—James J. Ralabate; Paul A. Leipold

[57] ABSTRACT

A method of forming particles of between about 5 and about 50 microns utilizing a two stage process wherein monomer possibly containing pigments, dyes and/or fillers such as silicon and magnetite, as well as chemical reagents such as crosslinking agents and chain transfer agents, is sized to a narrow range by high shear mixing then polymerized during slow speed agitation to form polymeric particles.

9 Claims, 4 Drawing Figures

METHOD OF SIZING MONOMER DROPLETS FOR SUSPENSION POLYMERIZATION TO FORM SMALL PARTICLES

BACKGROUND OF THE INVENTION

This invention relates to formation of polymeric particles of narrow size variation within the range having particle size between about 5 microns to about 50 microns by a suspension polymerization process.

The formation of small polymeric particles for use in electrostatic powder coating, fluidized bed coating and plastisols has generally been carried out by processes such as emulsion polymerization and dispersion of polymer in a liquid heated to above its melting temperature and then cooling in the liquid to form spherical particles. Using these processes, it has been difficult to achieve particles of small spherical particle size and narrow size range. The particles formed by conventional suspension polymerization are larger than desirable for powder coating or use in plastisols. Grinding or attrition, especially fluid energy milling, of larger particles to the size needed for powder coating is often not desirable both from an economic and functional viewpoint. Electrostatic powder coating with smaller particles is desirable as it allows complete coating of the article with a thinner film than is possible if only large particles are used. In order to obtain narrow ranges of small particles, it has previously been necessary to classify particles of a wide size range to separate the small ones with the resultant expense. Further, processes such as spray drying of polymer suspended in solvent can result in polymeric particles of a wide size range, as well as trapping of solvent which interferes with the use of the particles in plastisols or electrostatic powder coatings.

U.S. Pat. No. 3,505,434 discloses a process wherein particles suitable for fluidized bed coating are prepared by dispersing the polymer in a liquid which is heated to about 20° C above the polymer melting point and stirred, causing the polymer particles to attain a spherical or nearly spherical shape. The particles are then cooled below their melting point and recovered. However, this process apparently does not produce particles of narrow size distribution or of a size which is below 50 microns.

Suspension polymerization of monomer is a well known process for formation of polymer particles generally in a size range of about 200 to 600 microns. The advantages of suspension polymerization is that the configuration of the product is a bead or sphere which may easily be recovered and further that the dissipation of heat of formation is facilitated by the suspending phase. It is difficult by suspension polymerization to make small particles as the particles tend to coalesce during the polymerization process.

U.S. Pat. No. 3,819,597 discloses a process of suspension polymerization for producing large particle sizes using a two-stage process in which the monomer is partially polymerized prior to suspension in water for completion of polymerization.

U.S. Pat. No. 3,243,419 discloses a method of suspension polymerization wherein a suspending agent is generated during the suspension polymerization to aid in prevention of the coalescence of the particles. It is noted that in neither of these patents, is the size distribution narrow or the size small.

As can be seen, there remains a need for a process of producing polymer particles of spherical shape and narrow size range for average sizes below about 50 microns. Further, there remains a need for a process which would produce small particles without numerous polymer forming steps followed by particle forming steps. Further, there remains a need for the production of colored polymeric particles for use in electrostatic powder coating, fluidized bed coating and formation of plastisols.

SUMMARY OF THE INVENTION

It is, therefore, an object of this invention to provide a method of particle formation overcoming the above-noted deficiencies.

It is another object of this invention to provide a method of producing particles which overcome the above-noted deficiencies in the processes of small particle production.

It is still another object of this invention to provide particles of low cost.

It is a further object of this invention to provide a method of direct polymerization of small particles of narrow size range.

It is a further additional object of this invention to provide simplified equipment for small particle production.

It is a further object of this invention to provide a process for producing low-cost colored powder particles.

It is another object of this invention to form a stable monomer suspension of below about 50 micron average particle size.

It is a still further object of this invention to provide a method of particle size control during polymerization to form particles of less than 50 microns.

It is a further object to produce particles having a narrow size range and average size below about 50 microns.

These and other objects of the instant invention are accomplished, generally, by providing a process for dispersing in a first chamber a mixture of monomer, water and stabilization agent to a particle size range of about 15 microns and an average particle size less than about 50 microns. After sizing, the initial suspension is stable such that it may be transferred to a reactor and stirred at relatively low speeds such as between about 75 and 100 r.p.m. and remain in suspension during polymerization to form particles.

DETAILED DESCRIPTION OF THE INVENTION

Figure 1:
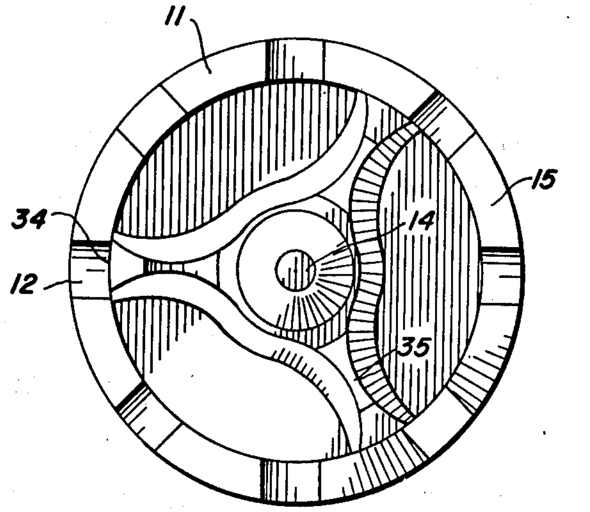
FIG. 1 is a view of a rotor stator mixer.

The particle formation process of the invention is carried out in one instance by the use of a styrene monomer containing lauroyl peroxide as an initiator. Utilizing a high speed and high shear mixer, the monomer containing the peroxide is suspended in an aqueous medium comprising water and a stabilization agent in an average particle size below 50 microns. The sized monomer is then transferred to a reactor which is agitated by a stirrer at about 75 r.p.m. as polymerization takes place. After polymerization is complete, the particles are recovered and found to be suitable for use as powder coating or in plastisol materials.

Any polymeric material which may be formed by suspension polymerization and which has a melting point within the range suitable for use as a powder coating or plastisol may be used in the particle forming process of the instant invention. Typical monomeric units which may be employed to form polymers include: epoxies, styrene, p-chlorostyrene; vinyl naphthalene; ethylenically unsaturated mono-olefins such as ethylene, propylene, butylene, isobutylene and the like; vinyl halides such as vinyl chloride, vinyl bromide, vinyl fluoride, vinyl acetate, vinyl propionate, vinyl benzoate, vinyl butyrate and the like; esters of alphamethylene aliphatic monocarboxylic acids such as methyl acrylate, ethyl acrylate, n-butylacrylate, isobutyl acrylate, dodecyl acrylate, n-octyl acrylate, 2-chloroethyl acrylate, phenyl acrylate, methyl-alpha-chloroacrylate, methyl methacrylate, ethyl methacrylate, butyl methacrylate and the like; acrylonitrile, methacrylonitrile, acrylamide, vinyl ethers such as vinyl methyl ether, vinyl isobutyl ether, vinyl ethyl ether, and the like; vinyl ketones such as vinyl methyl ketone, vinyl hexyl ketone, methyl isopropyl ketone and the like; vinylidene halides such as vinylidene chloride, vinylidene chlorofluoride and the like; and N-vinyl compounds such as N-vinyl pyrrole, N-vinyl carbazole, N-vinyl indole, N-vinyl pyrrolidene and the like; and mixtures thereof. Generally, suitable vinyl resins employed in the process have a weight average molecular weight between about 3,000 to about 500,000.

Resins containing a relatively high percentage of styrene resins are suitable for the process of the invention. The styrene resin may be a homopolymer of styrene or styrene homologues or copolymers of styrene with other monomeric groups containing a single methylene group attached to a carbon atom by a double bond. Thus, typical monomeric materials which may be copolymerized with styrene by addition polymerization include: p-chlorostyrene; vinyl naphthalene; ethylenically unsaturated mono-olefins such as ethylene, propylene, butylene, isobutylene and the like; vinyl halides such as vinyl chloride, vinyl bromide, vinyl fluoride, vinyl acetate, vinyl propionate, vinyl benzoate, vinyl butyrate and the like; esters of alpha-methylene aliphatic monocarboxylic acids such as methyl acrylate, ethyl acrylate, n-butylacrylate, isobutyl acrylate, dodecyl acrylate, n-octyl acrylate, 2-chloroethyl acrylate, phenyl acrylate, methyl-alphachloroacrylate, methyl methacrylate, ethyl methacrylate, butyl methacrylate and the like; acrylonitrile, methacrylonitrile, acrylamide, vinyl ethers such as vinyl methyl ether, vinyl isobutyl ether, vinyl ethyl ether, and the like; vinyl ketones such as vinyl methyl ketone, vinyl hexyl ketone, methyl isopropenyl ketone and the like; vinylidene halides such as vinylidene chloride, vinylidene chlorofluoride and the like; and N-vinyl compounds such as N-vinyl pyrrole, N-vinyl carbazole, N-vinyl indole, N-vinyl pyrrolidene and the like; and mixtures thereof. The styrene resins may also be formed by the polymerization of mixtures of two or more of these unsaturated monomeric materials with a styrene monomer. The expression "addition polymerization" is intended to include known polymerization techniques, such as radical, anionic and cationic polymerization processes. Monomers forming polystyrene and copolymers of styrene and n-butylmethacrylate have been found to be particularly suitable for the polymerization process of the invention as they result in good yields of completely polymerized monomer which are suitable for use as powder coating or plastisol material.

If desired, a suitable pigment material may be used in the process of the invention to form colored particles. A pigment generally should be capable of being dispersed in a monomer, be insoluble in the water used in the polymerization processes and give strong, clear, permanent colors when used in a coating or plastisol mixture. Typical of such pigments are carbon black, phthalocyanines, lithols, toluidene and inorganic pigment such as $TiO_2$. Typical of phthalocyanine pigments are copper phthalocyanine, mono-chlor copper phthalocyanine, hexadecachlor copper phthalocyanine, metal-free phthalocyanine, mono-chlor metal-free phthalocyanine, and hexadecachlor metal-free phthalocyanines; anthraquinone vat pigments such as: vat yellow 6 GL CI 1127, quinone yellow 18-1, indanthrone CI 1106, pyranthrone CI 1096; brominated pyranthrones such as: dibromopyranthrone, vat brilliant orange RK, anthrimide brown CI 1151, dibenzanthrone green CI 1101, flavanthrone yellow CI 1118; thioindigo pigments such as: thioindigo red and pink FF; azo pigments such as: toluidine red CI 69 and hansa yellow; and metalized pigments such as: azo yellow (green gold) and permanent red. The carbon black may be of any of the known types such as channel black or furnace black. Dyes may also be utilized to provide a colored polymer particle.

If desired or necessary, a reactive material which allows the cladding of the pigments to prevent their inhibition of or reaction with the monomer during its polymerization may be used in the invention. Pigments such as carbon inhibit polymerization. Typical of such reactive materials are water soluble monomers that precipitate onto carbon black or other pigments such as neutralized poly-acrylic acid and reactive silanes such as amine silicate-organosilane copolymers. Acrylonitrile monomer has been found to be a suitable water soluble monomer which will precipitate onto carbon. The reactive silanes of water emulsified or water soluble types have been found to be suitable for the treatment process. Typical of suitable organofunctional silanes are aminofunctional silane, methacrylate-functional silane, epoxide-functional silane, polyaminofunctional silane, mercaptofunctional silane, vinyl-functional silane, and chloroalkyl-functional silane; typical of suitable alkoxysilanes are methyltrimethoxysilane, phenyltrimethoxysilane, methylphenyldimethoxysilane, diphenyldimethoxysilane and typical of suitable silizanes is hexamethyldisilozane. A preferred silane is triethoxy silane ($C_{18}$—$Si(C_2H_5O)_3$) marketed as "Siliclad" by the Clay Adams Division of Becton Dickinson and Company, which gives a good polymeric coating on carbon black that prevents the inhibition of the polymerization process by carbon black. The polymerization time of a system containing Siliclad treated carbon black is about the same as the polymerization time of one not containing carbon black.

The cladding agent when utilized is provided in any amount which provides a covering of the pigment sufficient to prevent the pigment inhibiting complete polymerization to form the toner. Generally, the cladding agent is used in an amount that is the minimum which will give complete coverage as this keeps the expense and time of cladding low. Typically, an amount of cladding agent from about 0.05 to 10 percent by weight of the pigment may be utilized. A suitable range has been found to be 0.1 to 4 percent by weight of the pigment. A preferred range in the case of triethoxy silane is from about 1 percent to about 3 percent.

If desired, any suitable chain transfer agents or crosslinking agent may be used in the invention to modify the polymeric particle to produce particularly desired properties. Typical of crosslinking agents of the invention are aromatic divinyl compounds such as divinylbenzene, divinylnaphthalene or derivatives thereof; diethylenecarboxylate esters such as diethyleneglycol methacrylate, diethyleneglycol acrylate; any other divinyl compounds such as divinyl sulfide or divinyl sulfone compounds provided with three or more vinyl radicals; or mixtures of the foregoing compounds. Chain transfer agents act to control molecular weight by inhibiting chain growth. Typical of chain transfer agents of the invention are mercaptans such as laurylmercaptan, phenylmercaptan, butylmercaptan, dodceylmercaptan; or halogenated carbons such as carbon tetrachloride or carbon tetrabromide. Also, examples of materials which become effective when used in a much larger amount such as solvents for the vinyl monomer are substituted aromatic compounds such as toluene or isopropylbenzene; or substituted fatty acids such as trichloroacetic acid or tribromoacetic acid. Also, examples of materials which can be added as a monomer to be incorporated in the resulting polymer and simultaneously effect molecular weight control are ethylenic unsaturated monoolefins with radicals such as propylene or isobutylene; allyl compounds such as allyl benzene, allyl acetate or allylidene chloride.

Any catalyst or initiator which is compatible with the particular monomer being used may be utilized in the process of the invention. Typical of initiators for polymerization are the peroxide and azo initiators. Among those found suitable for use in the process of the invention are azobis(2-methylpropionitrile) and lauroyl peroxide which result in complete polymerization without leaving detrimental residual materials or requiring high temperatures or pressures. Chain transfer and crosslinking agents may be added to the monomer to aid in polymerization and control the properties of the particle formed.

It is generally desirable to utilize a stabilization agent other than the monomer itself in the solution. Such an agent aids in the formation of particles which will remain dispersed in the water during polymerization. Any suitable stabilization agent may be used. Typical of such stabilizers are both non-ionic and ionic water soluble polymeric stabilizers such as methyl cellulose, ethyl cellulose, sodium salt of carboxyl methyl cellulose, polyacrylate acids and their salts, polyvinyl alcohol gelatins, starchs, gums, alginates, zein and casein; and barrier stabilizers such as tricalcium phosphate, talc and barium sulfate. Suitable stabilization agents are polyacrylic acid, polymethacrylic acid, polyacrylamide and polyethylene oxide. A stabilizer agent found to be preferred for this invention in the suspension of polystyrenes is polyvinyl alcohol, which gives good suspension at low concentration and narrow particle range. The stabilizer is generally added in a ratio based on the amount of water. An amount of about 0.2 to about 5 percent by weight stabilizer in the water solution is suitable. An amount of about 0.2 to about 1.5 percent is preferred to give good suspension at low cost and low impurity in the particle. An optimum amount for use in formation of styrene particles is about 0.75 to about 1 percent to give low materials cost and narrow size distribution.

The dispersing of monomer may be carried out in any suitable type of mixer which results in particles of narrow size distribution in stable suspension. The mixer may be of either the batch or in line type. The preferred type mixer for the process is the rotor stator type mixer such as the Polytron or Dispac in which one element is stationary and the other rotates in close tolerance therewith while the liquid is drawn through appertures in the static element. The lowering of the viscosity of either the organic phase or the aqueous phase arrows the range of the particles. The length of high shear treatment also affects the average particle size and size range.

Figure 2:
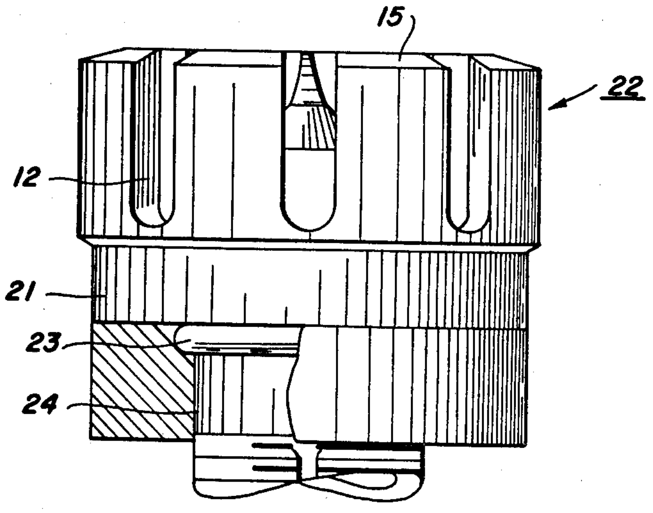
FIG. 2 is a view of the static element of the rotor stator mixer.
Figure 3:
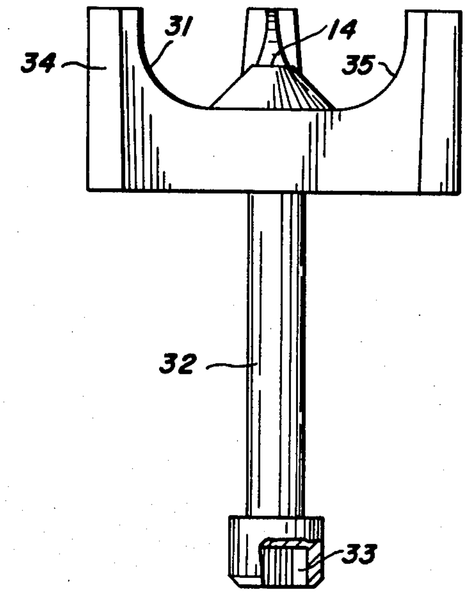
FIG. 3 is a view of the rotating element of the mixer.
Figure 4:
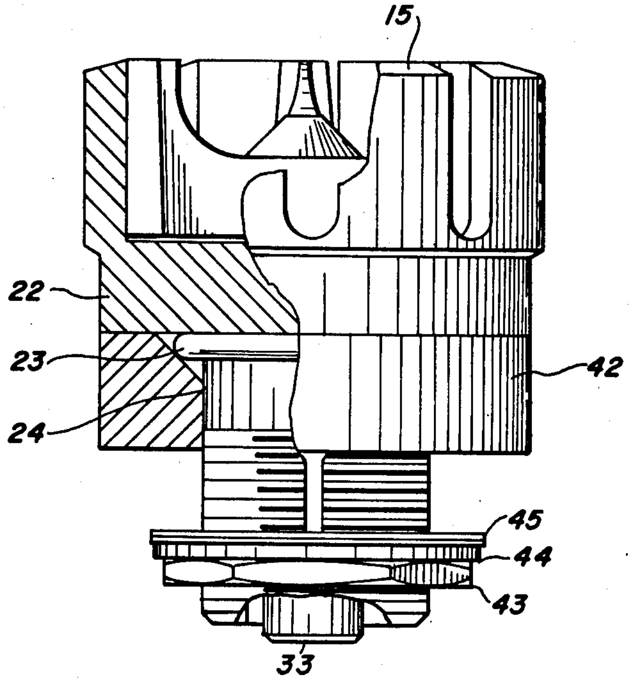
FIG. 4 illustrates a base construction for the rotor stator mixer.

The drawings illustrate a preferred type of rotor stator mixer. The mixer comprises a static element 22 as shown in FIG. 2. The static element comprises raised elements 15 separated by slots having a bottom 12. The static element is mounted on base 21 supported by mounting element 24. Gaskets such as 23 are used in mounting of the element. FIG. 3 illustrates the rotating element 31 of the mixer. The rotating element has blades 34 which correspond in height to the depth of the slots in the static element. The rotor is provided with a base 32 having an indented portion 33 for attachment to suitable drive means, now shown, such as a high speed blender. FIG. 1 illustrates the rotor and static element assembled to the mixing unit 11. The rotor is in close clearance with the static element and rotates around center 14. FIG. 4 illustrates attachment means for the mixer wherein a collar 42 is placed over base 24 of static element 22. The static element is secured with nut 43 keyed washer 44 and rubber shim 45. The indented portions of the rotor allow better flow of the material being treated.

The time of high shear mixing in part varies with the viscosity of the aqueous medium in which the pigmented monomer is suspended. Generally, the stabilization agent changes the viscosity of the aqueous suspension medium. A suitable viscosity range generally is between about 1 and 100 centipoises (cps). The preferred viscosity of the aqueous suspension medium is between about 1 and about 10 centipoises (cps) to give low cost and rapid mixing. An optimum range is about 1 to about 3 cps to give a stable dispersion of monomer with short mixing time, low cost and little impurity in the particle.

The rotor stator high speed high shear mixer is capable of producing narrow toner particle ranges. The size range of particles is affected by the viscosity of the aqueous solution, viscosity of the monomer and ratio of monomer to aqueous suspending medium. A suitable mixture is when the pigment containing monomer forms from about 0.2 to about 40 percent of the total volume of the monomer and water mixture. The size range produced may suitably be between about 2 and 30 microns. However, if preferred the range of particles may be between about 5 and 20 microns.

PREFERRED EMBODIMENTS

The following examples further define, describe, and compare methods of preparing particles of the instant invention suitable for use in plastisol and powder coating in applications. Parts and percentages are by weight unless otherwise indicated.

EXAMPLE I

To 100 grams of styrene monomer are added 5 grams of lauroyl peroxide which are mixed until dissolved. The monomer mix is then poured along with 500 cc. of a 1.25 percent polyvinyl alcohol water solution into a Waring Blender jar equipped with a Polytron mixing head. The two phase mixture is then stirred at 3,000 r.p.m. for 30 seconds to produce droplet dispersion with an average size of 12 microns.

The sized dispersion is transferred to a reactor vessel consisting of a 1,000 ml. round bottomed flask equipped with a paddle blade stirrer. With stirring speed of 60 to 80 r.p.m. the flask is heated to 70° C and controlled at that temperature by means of a constant temperature water bath.

The progress of the polymerization is followed by gel permeation chromatography. The rate of disappearance of both monomer and initiator is thus determined. After six hours, the polymerization is complete and the suspension of average 12 micron size particles is poured into three liters of cold water. The resulting diluted suspension is centrifuged 15 minutes at 1,000 r.p.m. in a bucket type centrifuge. The supernatent liquid consisting of the diluted polyvinyl alcohol is decanted, fresh water is added and the mixture is shaken for 5 minutes to disperse the particles. This washing procedure is repeated 3 times. After the final wash, the sedimented slurry is poured into a stainless steel tray and allowed to air dry. The resulting cake is very friable and can be broken down to individual particles by tumbling on a roll mill. The particles have an average particle size between about 8 and about 12 microns and 95 percent of the particles are between 5 and 20 microns.

EXAMPLE II 100 parts monomer consisting of a 65:35 ratio of styrene and n-butyl methacrylate, 1 part ethyl cellulose, 2 parts azobisisobutyronitrile are mixed in a Waring blender to give a well dispersed mixture. This mixture is added to 500 parts of 0.5 percent polyvinyl alcohol solution in a Waring blender jar equipped with a Polytron rotor stator mixing head. The mixture is agitated at 3,000 r.p.m. for 30 seconds to disperse the monomer phase in the water phase. The resulting dispersion is further stabilized by the addition of sufficient 5 percent polyvinyl alcohol solution to yield a 2.6 percent concentration of polyvinyl alcohol. The stabilized dispersion was then transferred to a 1,000 ml. polymerization flask equipped with an argon purge and paddle stirrer, and heated to 65° C while stirring at 60 r.p.m. After 8 hours, the resulting polymer dispersion is cooled by pouring into three liters of cold water. The particles are recovered by sedimentation and consist of generally spherical particles with an average particle diameter of 10 microns and a size range of 95 percent between 5 and 20 microns.

EXAMPLE III

The process of Example I is repeated except that the mixer is operated at 4,000 r.p.m. The average particle size is slightly smaller at about 8 microns with a 95 percent range between about 4 microns and about 15 microns.

EXAMPLE IV

The process of Example I is repeated except 3 percent polyvinyl alcohol is utilized. The particles of narrow size distribution are suitable for formation of plastisols. The size range is 95 percent between about 5 and 20 microns.

EXAMPLE V

As a control, the process of Example I was performed except that an ultrasonic mixer (Biosonic Transducer) is substituted for the rotor stator (Polytron) mixer. The particles that result have a particle range of about 95 percent between 5 and 100 microns.

EXAMPLE VI

As a control, the process of Example I is performed with particle sizing taking place by high speed stirring of the paddle blade stirrer at about 1,000 r.p.m. for about 15 minutes. The paddle stirrer is then slowed to about 75 r.p.m. for completion of polymerization. The particles recovered have a size range of 95 percent between about 5 and about 100 microns.

EXAMPLE VII

The method of Example I wherein the 0.5 grams of $TiO_2$ is added to the styrene monomer prior to sizing. Colored particles are produced in the same size range as Example I.

EXAMPLE VIII

The process of Example I is repeated except 7 grams of Malacco-H carbon black is added to the monomer prior to mixing. The carbon black has been treated in a stirred 2 percent aqueous solution of triethoxy silane for 5 minutes to coat it so as to not inhibit polymerization. Black particles of about 12 micron average particle size are produced and size range of 95 percent between about 5 and 20 microns.

Although specific materials and conditions were set forth in the above exemplary processes in the formation of the toner of the invention, these are merely intended as illustrations of the present invention. Various other substituents and processes such as those listed above, may be substituted for those in the Examples with similar results. In addition to the steps used to prepare the particles of the present invention, other steps or modifications may be used if desired. In addition, other materials may be incorporated into the particles of the invention which will enhance, synergize or otherwise desirably effect the properties of these materials for their present use. For example, additives to increase resistance to moisture absorption or to effect electrical properties, could be added to the surface of the particles.

Other modifications of the present invention will occur to those skilled in the art upon a reading of the present disclosure. For instance, metallic flakes could be used in the process if it was desired that a metallic flake coating be formed from the particles produced. Further, if particles for use in other processes were desired, the particle size could be regulated to be smaller such as 1 to 5 microns for use in other processes. Further the sizing may be performed as a thru put or in line process rather than the batch process illustrated.

What is claimed is:

1. A method of small particle formation comprising mixing a monomer composition in an aqueous solution comprising water and a stabilization agent, subjecting the mixture to high shear agitation for a short time of about 0.5 to about 5 minutes to size the monomer, transferring the sized monomer to a reaction vessel, slowly agitating the sized monomer in said reaction vessel, polymerizing the monomer and recovering polymeric particles of small, uniform size distribution wherein 95 percent of said polymeric particles range between about 5 and about 25 microns as a result of said shear agitation to size the monomer.

2. The method of claim 1 wherein 95 percent of said polymeric particles has a size distribution range of about 15 microns to about 25 microns.

3. The method of claim 1 wherein said monomer has a pigment dispersed therein.

4. The method of claim 1 wherein the high shear agitation device is a rotor-stator mixer.

5. The method of claim 1 wherein said stabilization agent is polyvinyl alcohol.

6. The method of claim 1 wherein said stabilization agent comprises about 0.5 to about 5 percent by weight of said aqueous solution.

7. The method of claim 1 wherein said monomer is selected from the group consisting of styrenes, olefins, epoxys and acrylates.

8. The method of claim 1 wherein said monomer composition additionally comprises a polymerization initiator.

9. The method of claim 1 wherein said monomer further comprises a material selected from the group comprising chain transfer agents, crosslinking agents and mixtures thereof.

* * * * *